July 7, 1942.  T. O. EDWARDS ET AL  2,289,109
PIPE-LINE CLEANER
Filed Oct. 2, 1940
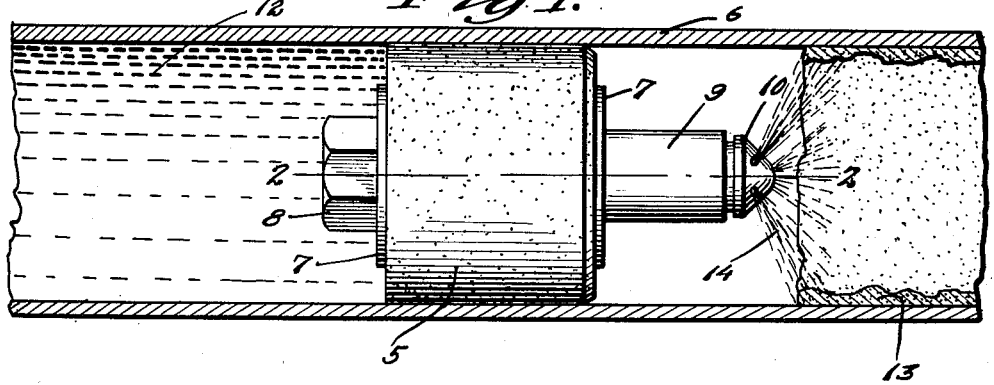
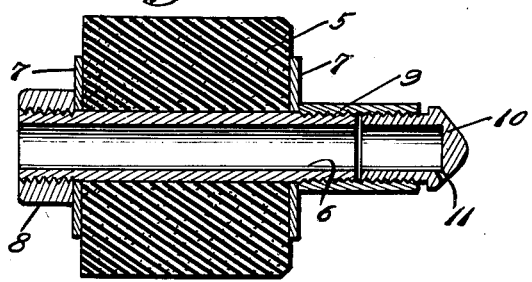
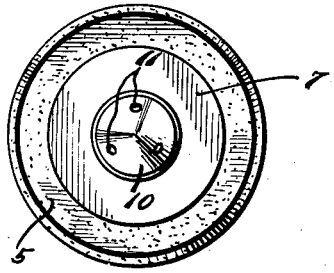
Inventor
Thomas O. Edwards
Harold B. Wright
By Clarence A. O'Brien
Attorney Patented July 7, 1942

2,289,109

UNITED STATES PATENT OFFICE 2,289,109

PIPE-LINE CLEANER

Thomas O. Edwards and Harold B. Wright, Russell, Kans.

Application October 2, 1940, Serial No. 359,423

1 Claim. (Cl. 15—104.06)

This invention relates to the cleaning of pipe lines and more particularly to such lines as are used for the passage of oil therethrough; and an object of the invention is to provide a device whereby the cleaning of such lines may be expedited, and also whereby the cleaning may be accomplished by the use of liquid, steam, or if desired, any suitable heat medium.

The invention together with its objects and advantages will be best understood from a study of the following description taken in connection with the accompanying drawing wherein:

Figure 1 is a longitudinal sectional view through a portion of a pipe line showing the invention in elevation, and illustrating one manner of using the invention.

Figure 2 is a sectional view taken substantially on the line 2—2 of Figure 1, and Figure 3 is an end elevational view of the cleaner.

Referring more in detail to the drawing it will be seen that in the preferred embodiment thereof the cleaner comprises a body 5 that is preferably cylindrical to fit conformably within the pipe line, a portion of which is shown in Figure 1 and indicated generally by the reference numeral 6. Also the body 5 is preferably formed of sponge rubber or analogous material so that with the periphery thereof in wiping engagement with the interior of the wall of the pipe a thorough cleaning of the pipe will be assured. The body 5, as shown in the drawing, is shorter, or of less length, than the diameter thereof to facilitate its passing through sharp bends in a pipe line.

The body 5 has an axial opening therethrough to accommodate a tubular core 6 that at its respective opposite ends projects beyond the body 5 as shown.

The body 5 is held in position on the core 6 between washers 7 and through the medium of a nut 8 threaded on one end of the core 6 and a tubular coupling element 9 threadedly engaged with the opposite end of the core 6.

Also in accordance with the present invention there is provided a nozzle 10 that is coupled with the last-named end of the core 6 through the medium of the aforementioned coupling sleeve 9 as shown in Figure 2.

The nozzle 10 is provided with a plurality of jet openings 11 as shown.

As suggested in Figure 1 the cleaner device is forced through the pipe line 6 preferably by a liquid 12 acting thereon.

The vehicle or instrumentality 12 may be in the nature of a liquid or live steam, and of a character as to be used effectively in placing the paraffin or asphalt clogging the line in solution so as to be readily forced out of the line ahead of the cleaning device. Preferably the instrumentality 12 will be either hot oil or steam applied under pressure behind the pipe-line cleaner; certain of the hot oil or steam, as the case may be, passing through the core 6 and discharging in advance of the cleaner through the orifices 11 as shown in Figure 1.

In using the pipe cleaner, it being a matter of common knowledge to those skilled in the art, that pipe lines become clogged and the inside coated with paraffin and asphalt to such an extent that in some instances the opening is no larger than a lead pencil even though the line be three or four inches in diameter, so that the first operation is to clean out the line at one end thereof to an extent sufficient for permitting the pipe line cleaner, constituting the subject matter of this invention, to be inserted into the pipe line. Then the hot oil, steam, or other liquid is applied behind the pipe line cleaner under considerable pressure. As a result the paraffin or asphalt is placed in solution and washed out of the line ahead of the cleaner, the cleaner being pushed forward as a result of the pressure behind it. As a result of the above the cleaner and the sludge formation in advance thereof is finally pushed out of the line in a mass.

A very important feature of the present invention is therefore the dissolving, as provided for by this invention, of the paraffin or asphalt in advance of the cleaner, thus insuring a removal of all of the sludge or foreign matter as a result of the cleaning operation.

It will also be appreciated that with a cleaner of this character hot oil, or other liquid, or steam may be used to advantage in maintaining sufficient pressure behind the cleaner for forcing the same through the line, and at the same time place the impediments in the line in solution so as to insure a thorough removal of the foreign matter from the pipe line, it being found in actual practice that during the operation the cleaner device moves constantly through the line so that the cleaning is accomplished in an efficient manner and within a minimum of time.

It is thought that the simplicity, as well as the many advantages, of a device of this character will be had by those skilled in the art without a more detailed description thereof.

Having thus described the invention what is claimed as new is:

A pipe cleaning device adapted to be propelled through a pipe under liquid or steam pressure behind the same to eject foreign matter out of said pipe and comprising a cylindrical body of resilient material adapted to be axially compressed under such pressure and thereby expanded radially against said pipe to frictionally grip the same, said body being of a length less than the diameter thereof to facilitate its passing through sharp bends in a pipe, a tubular axial core in said body for the passage of said liquid or steam forwardly therethrough and having front and rear ends extending forwardly and rearwardly of said body, means on said ends of the core for confining said body thereon against axial displacement relative to the core, a spray nozzle provided with outwardly and forwardly diverging discharge ducts for ejecting the liquid or steam passing through said core against foreign matter in said pipe to act on such matter and soften the same, and a coupling securing the nozzle to said core well in advance of the body whereby the action of the spray is rendered thoroughly effective before said body acts to eject said foreign matter, said nozzle having a conical leading end functioning as a wedge against obstructions and in which said discharge ducts are arranged.

THOMAS O. EDWARDS.
HAROLD B. WRIGHT.